March 9, 1926.
S. J. RUSSELL ET AL
1,576,364
ONION AND POTATO DIGGER ATTACHMENT
Filed April 24, 1924
2 Sheets-Sheet 1
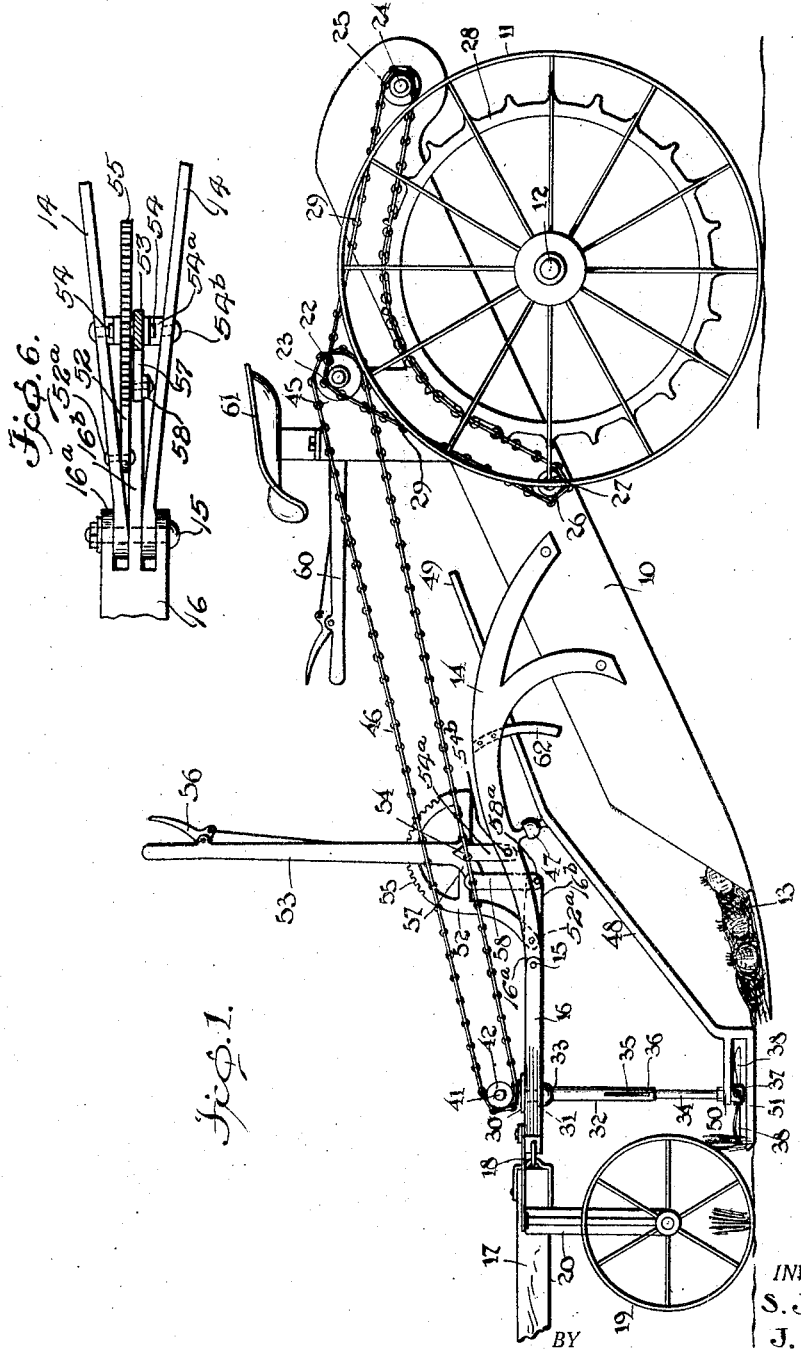
INVENTOR.
S. J. Russell,
J. Godwin,
BY
ATTORNEY.

March 9, 1926.  1,576,364
S. J. RUSSELL ET AL
ONION AND POTATO DIGGER ATTACHMENT
Filed April 24, 1924  2 Sheets-Sheet 2
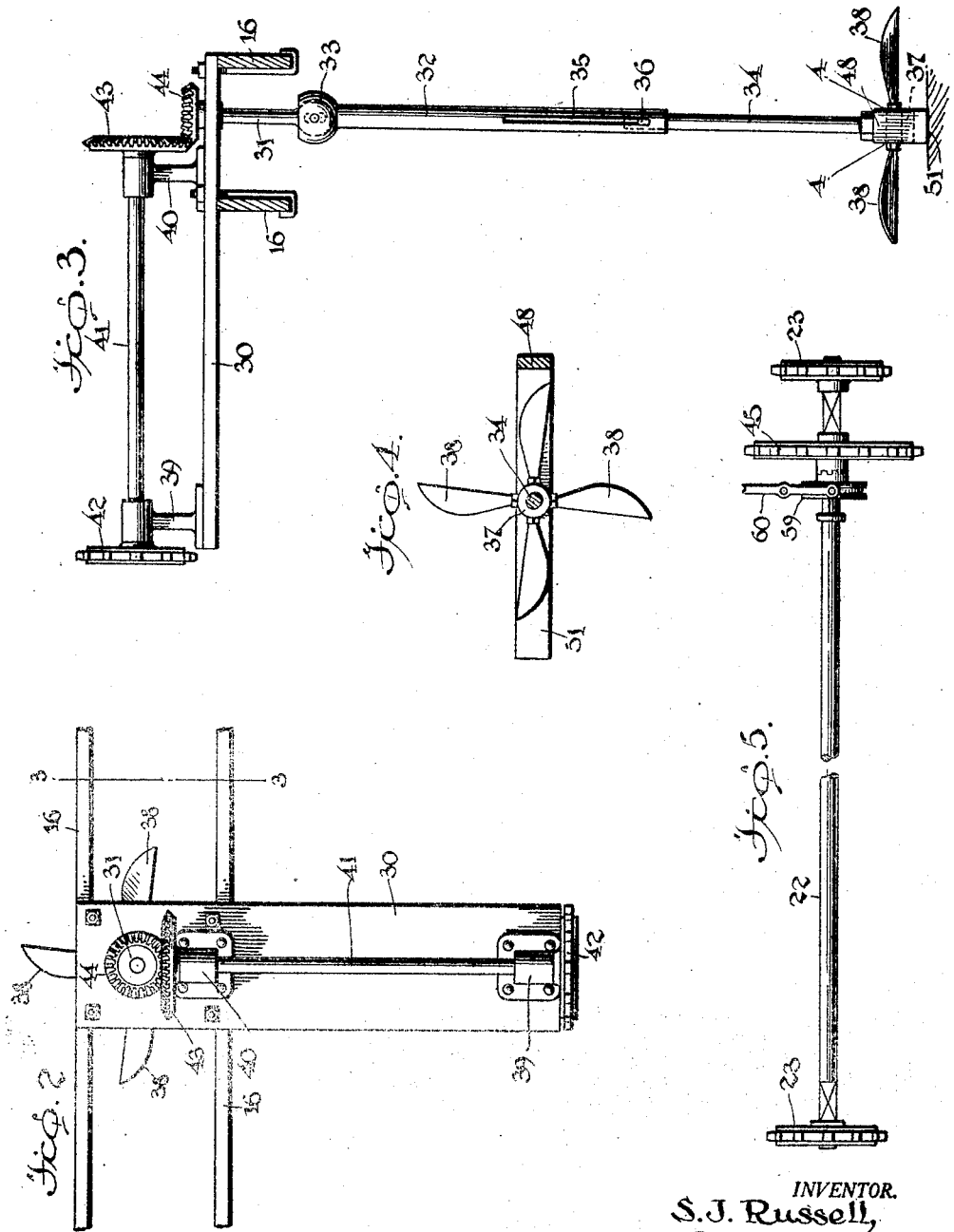
INVENTOR.
S. J. Russell,
J. Godwin,
BY
ATTORNEY.

Patented Mar. 9, 1926.

1,576,364

UNITED STATES PATENT OFFICE.

SAMUEL J. RUSSELL AND JOE GODWIN, OF PRINCETON, TEXAS.

ONION AND POTATO DIGGER ATTACHMENT.

Application filed April 24, 1924. Serial No. 708,732.

*To all whom it may concern:*

Be it known that we, SAMUEL J. RUSSELL and JOE GODWIN, citizens of the United States, residing at Princeton, in the county of Collin and State of Texas, have invented certain new and useful Improvements in Onion and Potato Digger Attachments, of which the following is a specification.

This invention relates to combined onion, beet, or potato topper and harvesters, and has for one of its objects to improve the construction and increase the efficiency and utility of devices of this character.

Another object of the invention is to provide a device of this character, which may be combined with various constructions of harvesters, without material structural change in the harvester or in the attachment.

Another object of the invention is to provide a simply constructed topping attachment for the harvesters of onions, beets, potatoes, and the like, and which may be installed upon the harvester without material change in the harvester or the attachment.

With these and other objects in view the invention consists in certain novel features of construction as hereinafter shown and described and then specifically pointed out in the claim, and in the drawings illustrative of the preferred embodiment of the invention.

Figure 1 is a side elevation of an onion, beet or potato harvester, with the improvement applied.

Figure 2 is a detail plan view of a part of the cutter driving mechanism.

Figure 3 is a view in section on the line 3—3 of Figure 2, looking in the direction of the arrow.

Figure 4 is a plan view of the top severing element with the supporting shaft in section on the line 4—4 of Figure 3.

Figure 5 is a plan view of the drive shaft of the severing element, detached.

Fig. 6 is a detail view of the mounting of the segment.

In the drawings Figure 1 shows a side elevation of a conventional onion or potato digger with the improved attachment applied, and in which 10 represents the main supporting frame of the excavator and elevator, and 11 one of the traction wheels mounted on an axle 12 and on which the excavator frame is mounted to swing or tilt. The plow or shovel part of the excavator is represented at 13.

Rigidly attached to the sides of the frame 10 are bracket like devices which constitute frames 14, the forward ends of which are pivoted at 15 between the ears 16$^a$ and the centrally arranged rearwardly extending elongated tongue 16$^b$, which ears and tongue form a part of a frame 16 to the forward part of which frame the draft appliance 17 is coupled as at 18.

The forward guide or caster wheels 19 are suspended from the member 16 by a hanger 20. Supported on the excavator frame 10 is a shaft 22 carrying a small chain pinion 23, and likewise mounted on the frame 10 is another shaft 24 carrying a chain wheel 25, while an idler chain pulley 26 is likewise mounted on a stub shaft 27 on the frame 10.

Mounted to rotate with the axle 12 is a relatively large chain wheel 28. An endless chain 29 engages around the three chain wheels 23—25—26 and likewise over the larger chain wheel 28.

The shaft 24 carries chain pulleys over which the main elevator belt of the harvester operates, the elevator belt not being shown as it forms no part of the present invention. By the arrangement shown, when the harvester is moved forwardly the motion of the traction wheels 11 will be imparted to the endless chain 29 and thence to the shafts 22—24—27, and rotate the shafts, as will be obvious.

Extending over the members of the forward frame portion 16 is a bearing member 30, and supported by the latter is a vertical shaft 31, having a lower tubular extension portion 32 coupled thereto by a knuckle or universal joint 33.

The extension shaft section 32 is tubular, and slidably disposed therein is a lower extension shaft section 34. The tubular shaft section 32 is longitudinally slotted as shown at 35, and extending through the shaft section 34 and likewise through the slots is a pin 36. By this means the lower shaft section 34 is vertically movable relative to the tubular shaft section 32, but rotates in unison therewith.

Attached by its hub 37 to the lower end of the shaft section 34 is a cutter element consisting of blades 38 directed radially of the hub 37.

Mounted in standards 39 and 40 on the bearing member 30 is a counter shaft 41, carrying a chain pulley 42 at one end and with a bevel gear 43 at the other end in constant engagement with a bevel gear 44 on the upper end of the vertical upper shaft section 31.

The shaft 22 is provided with a chain pulley 45 in alinement with the chain pulley 42, and an endless chain 46 operates over the alined pulleys.

By this means the motion of the shaft 22 is communicated to the shaft sections 32 and 34 and the cutter element 37—38.

Connected by a knuckle coupling 47 to the bracket 14, is a relatively long lever 48 having a foot engaging terminal 49 at its rear end and swingingly connected at 50 to the shaft section 34.

Extending from the lever 48 near its forward end is a guard finger or shoe 51 which serves as a guard beneath the cutter element 38, and not only prevents the clogging of the cutter by stripping the severed vines therefrom, but likewise limits the downward movement of the cutter and prevents it from penetrating the ground as the machine is moved forwardly.

When the machine is moved over the ground, the shoe member 51 travels upon the surface of the ground, and holds the cutter element at a uniform distance from the surface of the ground, so that the tops of the onions, beets, potatoes or the like are effectually severed in advance of the action of the excavating shovel 13. The blades 38 of the cutter element, it will be noted, are curved upwardly toward the rear edges, hence as the blades are rapidly rotated, they not only effectually sever the tops, but likewise throw them to one side out of the path of the excavating shovel.

Mounted at 52$^a$ upon one of the frames 14 is an upwardly directed arm 52 which supports a toothed segment 55, which segment is additionally centrally supported upon the pivot pin 54 which extends through and between the upper ends of supporting brackets 54$^a$, the lower end of each bracket being secured to a frame 14 as at 54$^b$. Also mounted upon the pivot pin 54 is a lever 53 having its lower end formed to provide the extended arm 57, which arm is loosely connected by means of the link 58 to the extended rear end of the tongue 16$^b$ as at 58$^a$. The lever is provided with the usual member 56 for controlling a dog (not shown) which engages between the teeth of the segment 56. By this means the frames 10 and 14 and attached parts, may be raised or lowered to control the depths of action of the shovel, or to elevate it clear of the ground when the machine is idle or is to be transported.

A suitable clutch device illustrated conventionally at 59 is coupled between the shaft 22 and the chain wheel 45, and is operated by a lever device 60 convenient to the driver on the seat 61.

A notched segment 62 is attached to the bracket device 14, to be engaged by the foot lever 48, to hold the cutter in adjusted position and to likewise retain the cutter in inoperative position when not in use, or when the machine is being moved from place to place or when stored.

Having thus described the invention, what is claimed as new is:

In a machine of the character described, excavating and elevating means having traction wheels, a bracket fixed to and extending forwardly of said means, a wheeled draft appliance in advance of and pivoted to the bracket, a forwardly inclined foot lever having universal joint connection with the bracket, a shoe on the lower end of the lever, a shaft depending from and having universal connection with the draft appliance, a cutter located within the shoe and having slidable connection with the shaft, means on the bracket for latching the foot lever in adjusted position, and means for raising and lowering the bracket.

In testimony whereof, we affix our signatures hereto.

SAMUEL J. RUSSELL.
JOE GODWIN.